United States Patent
Yoshida et al.

(10) Patent No.: US 8,802,292 B2
(45) Date of Patent: Aug. 12, 2014

(54) HYDROGEN-ABSORBING ALLOY FOR ALKALINE STORAGE BATTERY AND METHOD FOR MANUFACTURING THE SAME

(75) Inventors: Shuhei Yoshida, Ibaraki (JP); Kazuaki Tamura, Naruto (JP); Yoshinobu Katayama, Naruto (JP); Teruhito Nagae, Tokushima (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 237 days.

(21) Appl. No.: 12/816,602

(22) Filed: Jun. 16, 2010

(65) Prior Publication Data
US 2010/0323243 A1    Dec. 23, 2010

(30) Foreign Application Priority Data

Jun. 18, 2009   (JP) ................. 2009-144799
May 27, 2010   (JP) ................. 2010-121177

(51) Int. Cl.
H01M 4/13    (2010.01)
H01M 4/24    (2006.01)
H01M 10/34   (2006.01)
H01M 4/38    (2006.01)

(52) U.S. Cl.
CPC ............ *H01M 4/242* (2013.01); *H01M 10/345* (2013.01); *H01M 4/383* (2013.01); *Y02E 60/124* (2013.01)
USPC .................................. 429/218.2; 429/218.1

(58) Field of Classification Search
CPC ... H01M 4/242; H01M 10/345; H01M 4/383; Y02E 60/124
USPC ........................................... 429/218.2
See application file for complete search history.

(56) References Cited

U.S. PATENT DOCUMENTS 7,829,220 B2 *   11/2010   Yoshida et al. ............ 429/218.2
2009/0226342 A1 *   9/2009   Kanemoto et al. ............ 420/455

FOREIGN PATENT DOCUMENTS

WO   2007-018292 A1   2/2007

* cited by examiner

*Primary Examiner* — Gary Harris
(74) *Attorney, Agent, or Firm* — Westerman, Hattori, Daniels & Adrian, LLP

(57) ABSTRACT

A hydrogen-absorbing alloy for an alkaline storage battery with high power characteristics and excellent output power stability and a method for manufacturing the same are provided. The hydrogen-absorbing alloy for an alkaline storage battery of the invention is represented by $AB_n$ (A: $La_xRe_yMg_{1-x-y}$, B: $Ni_{n-z}T_z$, Re: at least one element selected from rare earth elements including Y (other than La), T: at least one element selected from Co, Mn, Zn, and Al, and z>0) and has a stoichiometric ratio n of 3.5 to 3.8, a ratio of La to Re (x/y) of 3.5 or less, at least an $A_5B_{19}$ type structure, and an average C axis length α of crystal lattice of 30 to 41 Å.

4 Claims, 2 Drawing Sheets

HYDROGEN-ABSORBING ALLOY FOR ALKALINE STORAGE BATTERY AND METHOD FOR MANUFACTURING THE SAME

TECHNICAL FIELD

The present invention relates to a hydrogen-absorbing alloy for an alkaline storage battery that is suited for applications requiring high current discharge (high power applications), such as hybrid electric vehicles (HEVs) and pure electric vehicles (PEVs) and a method for manufacturing the same.

BACKGROUND ART

An alkaline storage battery using a hydrogen-absorbing alloy as the negative electrode has excellent safety and is therefore used for high power applications such as HEVs and PEVs.

The hydrogen-absorbing alloy is commonly composed of a single-phase of an $AB_2$ type structure or $AB_5$ type structure. However, recently, the hydrogen-absorbing alloy has been required to have much higher power or much higher capacity performance than the conventional range. Accordingly, a hydrogen-absorbing alloy including as the main phase an $A_2B_7$ type structure or $A_5B_{19}$ type structure in which an $AB_2$ type structure and $AB_5$ type structure are combined, such as a rare earth-Mg—Ni-based alloy has been proposed. (International Publication WO 2007/018292)

The crystal structure of the rare earth-Mg—Ni-based hydrogen-absorbing alloy is transformed based on its stoichiometric ratio. That is, when the stoichiometric ratio is increased, the $A_5B_{19}$ type structure becomes dominant from the $A_2B_7$ type structure.

Because the $A_5B_{19}$ type structure has a periodically stacked structure including one layer of the $AB_2$ type structure and three layers of the $AB_5$ type structure, the nickel ratio per unit crystal lattice can be improved, and therefore, an alkaline storage battery using the rare earth-Mg—Ni-based hydrogen-absorbing alloy that contains (a relatively large amount of) the $A_5B_{19}$ type structure as the main phase shows especially excellent high power.

On the other hand, the high power application for HEVs commonly employs a partial charge-discharge control system in which pulse charge and discharge are repeated, for example, in the range of a state of charge (SOC) from 20 to 80%.

Accordingly, in the high power application for HEVs, the alkaline storage battery to be used is required to have excellent power characteristics as well as power characteristics with small variation associated with SOC variation (excellent output power stability).

Generally, the power characteristics of the alkaline storage battery containing the hydrogen-absorbing alloy closely relates to the absorption hydrogen equilibrium pressure of the hydrogen-absorbing alloy. That is, when the hydrogen-absorbing alloy has a high absorption hydrogen equilibrium pressure, the power characteristics become high, and when the hydrogen-absorbing alloy has a low absorption hydrogen equilibrium pressure, the power characteristics become low.

Consequently, when the absorption hydrogen equilibrium pressure of the hydrogen-absorbing alloy varies associated with the SOC variation, the power characteristics vary.

When the power characteristics vary associated with the SOC variation, a predetermined output power cannot be obtained in a certain SOC range. Thus, the variation of the power characteristics associated with the SOC variation is not preferable for the high power application for HEVs that requires a constant output power over from low SOC to high SOC.

Therefore, in order to reduce the variation of the power characteristics associated with the SOC variation, it is necessary to control the hydrogen-absorbing alloy so that the absorption hydrogen equilibrium pressure varies in a small range associated with the SOC variation. That is, it is necessary to control the hydrogen-absorbing alloy so that the variation of the absorption hydrogen equilibrium pressure is reduced in a plateau region of a PCT curve of the hydrogen-absorbing alloy (a region observed in the range of an SOC of 20 to 80%, where the absorption hydrogen equilibrium pressure of the hydrogen-absorbing alloy does not largely vary associated with the SOC variation) corresponding to a practical region.

In particular, when a rare earth-Mg—Ni-based hydrogen-absorbing alloy having the $A_5B_{19}$ type structure (because the crystal structure of the hydrogen-absorbing alloy has poor stability, subphases such as an $A_2B_7$ type structure, $AB_5$ type structure, and $AB_3$ type structure are readily generated) as the main phase is used in order to obtain high power characteristics, the alloy has the problem that such subphases reduce the flatness in the plateau region of the PCT curve of the hydrogen-absorbing alloy to reduce the output power stability. Therefore, when the hydrogen-absorbing alloy is used, it should be noted that the alloy is controlled so that the variation of the absorption hydrogen equilibrium pressure in the plateau region of the PCT curve would be reduced.

Meanwhile, the reason why the subphases reduce the flatness in the plateau region of the PCT curve of the hydrogen-absorbing alloy as discussed above is considered as follows.

Generally, when the hydrogen-absorbing alloy is composed of a plurality of crystal structures, the PCT curve of the hydrogen-absorbing alloy is a mixture (see FIG. 2B) of the PCT curve of each crystal structure (see FIG. 2A).

However, the PCT curves are not equally mixed in all SOC regions, and mixed differently between in a low SOC region and a middle to high SOC region, and thus the finally obtained PCT curve has a tilted plateau region (see FIG. 2B).

This is because, in a low SOC region, a crystal structure having a low absorption hydrogen equilibrium pressure dominantly relates to hydrogen absorption and desorption and, on the other hand, in middle to high SOC regions, a crystal structure having a high absorption hydrogen equilibrium pressure dominantly relates to the hydrogen absorption and desorption. Thus, it is considered that the PCT curves of the hydrogen-absorbing alloy are mixed in the low SOC region so as to shift to the PCT curve of the crystal structure having a low absorption hydrogen equilibrium pressure and, on the other hand, the PCT curves of the hydrogen-absorbing alloy are mixed in a high SOC region so as to shift to the PCT curve of the crystal structure having a high absorption hydrogen equilibrium pressure.

The PCT curve of each crystal structure is mixed as described above and, as a result, the plateau region of the PCT curve of the hydrogen-absorbing alloy is tilted to have poor flatness.

Therefore, it is considered that a battery using such a hydrogen-absorbing alloy has a large variation in the power characteristics associated with the SOC variation to reduce the stability of the power characteristics.

Actually, in the case of the rare earth-Mg—Ni-based hydrogen-absorbing alloy having the $A_5B_{19}$ type structure as the main phase, because the $A_5B_{19}$ type structure as the main phase has a large absorption hydrogen equilibrium pressure and the $A_2B_7$ type structure and the like generated as the subphases have low absorption hydrogen equilibrium pressures, when the proportion of the $A_2B_7$ type structure and the like as the subphases having low absorption hydrogen equilibrium pressures becomes larger, the PCT curve of the hydrogen-absorbing alloy in the low SOC region is mixed so as to shift to the PCT curve of the $A_2B_7$ type structure and the like as the subphase.

As described above, in the rare earth-Mg—Ni-based alloy having the $A_5B_{19}$ type structure as the main phase, it is important to control the structure ratio of the subphases such as the $AB_3$ type structure, $AB_5$ type structure, and $A_2B_7$ type structure.

However, the structure ratio control of the subphases by the alloy composition control in related arts cannot sufficiently inhibit the stability reduction of the output power.

Thus, by focusing on a multiphase technique in which manufacturing process control is combined with the alloy composition control, an advantage of some aspects of the invention is to provide a hydrogen-absorbing alloy for an alkaline storage battery having high power characteristics and excellent output power stability and a method for manufacturing the same.

SUMMARY

A hydrogen-absorbing alloy for an alkaline storage battery according to an aspect of the present invention includes $AB_n$ (A: $La_xRe_yMg_{1-x-y}$, B: $Ni_{n-z}T_z$, Re: at least one element selected from rare earth elements including Y (other than La), T: at least one element selected from Co, Mn, Zn, and Al, and z>0) and has a stoichiometric ratio n of 3.5 to 3.8, a ratio of La to Re (x/y) of 3.5 or less, at least an $A_5B_{19}$ type structure, and an average C axis length $\alpha$ of crystal lattice of 30 to 41 Å.

In the hydrogen-absorbing alloy for an alkaline storage battery having the above structure, because the structure ratio of the $AB_3$ type structure, $AB_5$ type structure, and $A_2B_7$ type structure as the subphases that cause poor flatness in the plateau region of the PCT curve is controlled to be in a predetermined range, as shown in FIG. 2C, the plateau region of the PCT curve of the hydrogen-absorbing alloy has a small slope and high flatness, and thus the hydrogen-absorbing alloy has excellent stability of the power characteristics.

Here, whether the structure ratio of the $A_5B_{19}$ type structure as the main phase and the $AB_3$ type structure, $AB_5$ type structure, and $A_2B_7$ type structure as the subphases is in a predetermined range can be determined by the average C axis length of crystal lattice of the hydrogen-absorbing alloy as an index. The reason will be described below.

Namely, each of the $A_5B_{19}$ type structure as the main phase and the $AB_3$ type structure, $AB_5$ type structure, and $A_2B_7$ type structure as the subphases has the intrinsic C axis length of crystal lattice. For example, a $Gd_2Ni_7$ type structure (rhombohedral crystal) representing the $A_2B_7$ type structure has an intrinsic C axis length of crystal lattice of 36.1 Å, a $Ce_2Ni_7$ type structure (hexagonal crystal) representing the $A_2B_7$ type structure has an intrinsic C axis length of crystal lattice of 24.5 Å, a $Ce_5Co_{19}$ type structure (rhombohedral crystal) representing the $A_5B_{19}$ type structure has an intrinsic C axis length of crystal lattice of 48.7 Å, and a $Pr_5Co_{19}$ type structure (hexagonal crystal) representing the $A_5B_{19}$ type structure has an intrinsic C axis length of crystal lattice of 32.4 Å.

Here, the C axis length of a crystal structure is multiplied by the structure ratio of the crystal structure. Then, the total sum of the multiplied values from all crystal structures is defined as an average C axis length (Å) of crystal lattice in the hydrogen-absorbing alloy. Therefore, when the structure ratio of each type structure is determined, the average C axis length $\alpha$ of crystal lattice in the hydrogen-absorbing alloy can be uniquely determined.

In the hydrogen-absorbing alloy for an alkaline storage battery of the invention, as described later, it is ascertained that, when the average C axis length $\alpha$ of crystal lattice in the hydrogen-absorbing alloy is 30 to 41 Å, the reduction of the output power stability is inhibited.

Furthermore, in the hydrogen-absorbing alloy for an alkaline storage battery in a second aspect of the invention, in the general formula, it is preferable that z is 0.25 or less and T does not include Co.

When z is more than 0.25, the amount of an Ni replacing element with a low melting point is increased to increase a segregation phase, and then the corrosion resistance is reduced. Thus, z is preferably 0.25 or less.

Furthermore, when Co is used as the Ni replacing element T, Co is leached out in an alkaline storage battery to re-precipitate on a separator and then causes micro-short circuit. Thus, Co is not suited for the alloy structural element for the applications with high reliability such as HEVs.

Therefore, it is preferable that the hydrogen-absorbing alloy does not include Co as the Ni replacing element T.

Furthermore, a method for manufacturing a hydrogen-absorbing alloy for an alkaline storage battery of according to an aspect of the invention includes heating and melting a metallic element, the metallic element being a raw material of the hydrogen-absorbing alloy; solidifying the heated and melted metal to make an alloy ingot of the hydrogen-absorbing alloy, the alloy ingot being represented by $AB_n$ (A: $La_xRe_yMg_{1-x-y}$, B: $Ni_{n-z}T_z$, Re: at least one element selected from rare earth elements including Y (other than La), T: at least one element selected from Co, Mn, Zn, and Al, and z>0), the stoichiometric ratio n being 3.5 to 3.8, and a ratio of La to Re (x/y) being 3.5 or less; and heat-treating the alloy ingot at a temperature of from 90° C. to 40° C. lower than a melting point of the hydrogen-absorbing alloy for 10 hours or more.

According to the manufacturing method, in the heat-treating process, the $A_2B_7$ type crystal structure in the hydrogen-absorbing alloy is transformed into the $A_5B_{19}$ type crystal structure to increase the structure ratio of the $A_5B_{19}$ type structure. Thus, the hydrogen-absorbing alloy for an alkaline storage battery having high flatness of the plateau region of the PCT curve of the hydrogen-absorbing alloy and having excellent stability of the power characteristics can be manufactured.

In contrast, when the heat treatment period is less than 10 hours, when the heat treatment temperature is below a temperature of 90° C. lower than the melting point of the hydrogen-absorbing alloy, or when the heat treatment temperature is over a temperature of 40° C. lower than the melting point of the hydrogen-absorbing alloy, the transformation of the crystal structure into the $A_5B_{19}$ type structure is insufficient to decrease the output power stability.

Therefore, the heat treatment requires a temperature of from 90° C. to 40° C. lower than the melting point of the hydrogen-absorbing alloy for 10 hours or more.

According to the present invention, in a rare earth-Mg—Ni-based hydrogen-absorbing alloy containing the $A_5B_{19}$ type structure as the main phase or relatively large amount of the $A_5B_{19}$ type structure, by controlling the structure ratio of the subphases such as the $AB_3$ type structure, $AB_5$ type structure, and $A_2B_7$ structure, the hydrogen-absorbing alloy for an alkaline storage battery having high power characteristics and excellent output power stability and the method for manufacturing the same can be provided.

DESCRIPTION OF EXEMPLARY EMBODIMENTS

Figure 1:
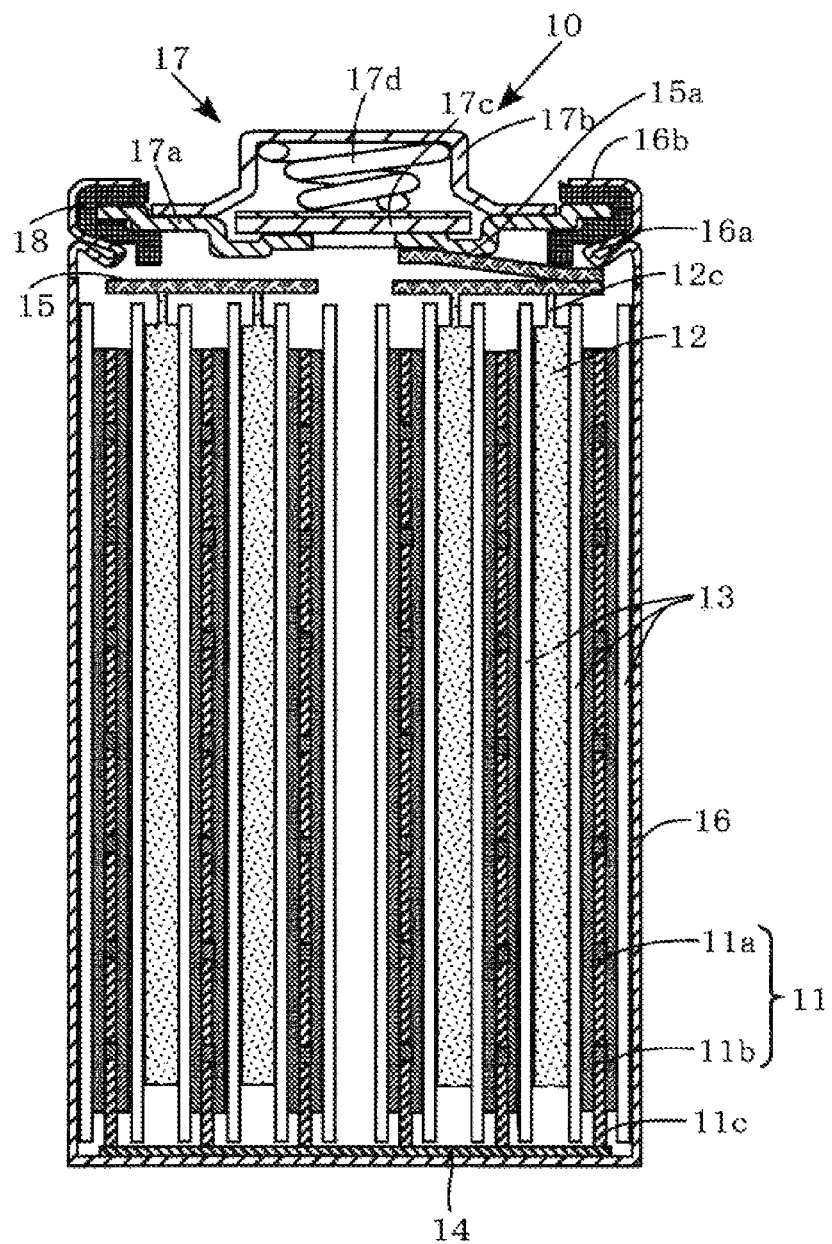
FIG. 1 is a schematic sectional view showing an alkaline storage battery using a hydrogen-absorbing alloy for an alkaline storage battery of the invention.
Figure 2C:
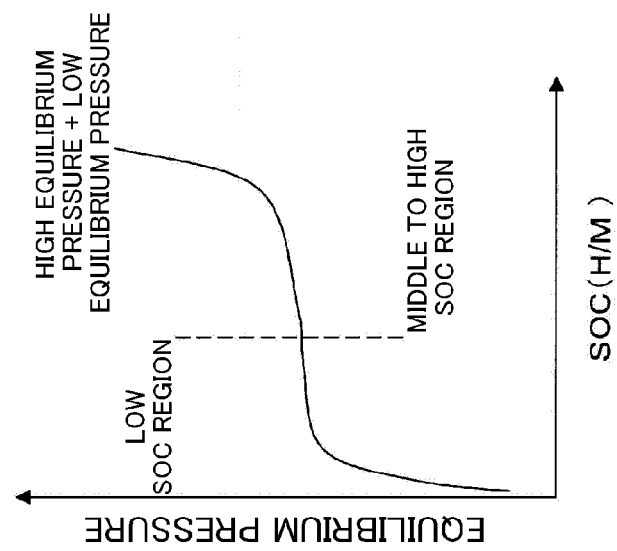
FIG. 2 is a schematic view explaining a PCT curve of a hydrogen-absorbing alloy.
Figure 2B:
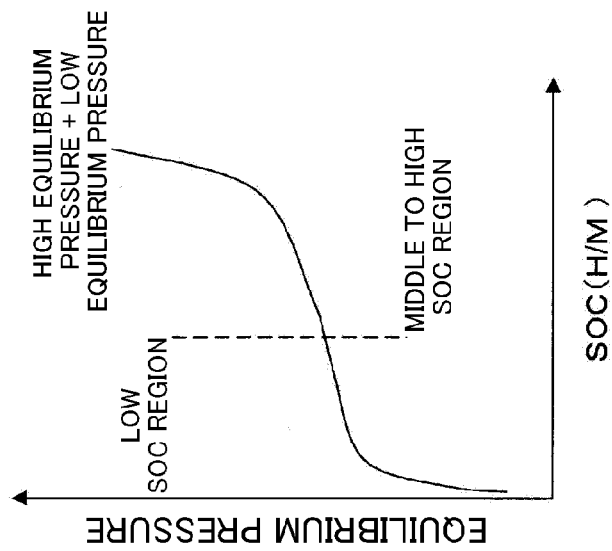
Figure 2A:
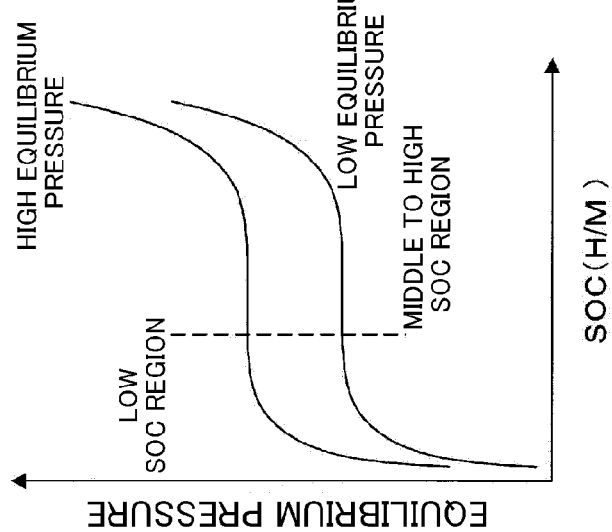

Next, exemplary embodiments of the invention will now be described in detail below. However, it should be understood that the invention is not limited to the embodiments, and various changes and modifications may be made in the invention as appropriate, without departing from the spirit and scope thereof.

1. Hydrogen Storage Alloy

Metallic elements were mixed so as to be a predetermined molar ratio, then, the mixture was cast into a high-frequency induction heater under an argon gas atmosphere to be melted, and the melted metal was poured into a mold for solidification to prepare each of hydrogen-absorbing alloys A to K in ingot form each having the composition shown in Table 1.

Next, each melting point (Tm) of the obtained hydrogen-absorbing alloys A to K was determined using a differential scanning calorimeter (DSC).

Then, each of the hydrogen-absorbing alloys A to K was heat-treated at a temperature (Tm—Ta) lowered by a predetermined temperature (Ta) from each melting point (Tm) for a predetermined period. The heat treatment temperature (Ta—Tm) and the heat treatment period performed on each of the hydrogen-absorbing alloys A to K are shown in Table 1.

Then, each of the hydrogen-absorbing alloy ingots was roughly crushed, and then, mechanically pulverized under an inert gas atmosphere to prepare hydrogen-absorbing alloy powders A1 to A7 and B to K each having a particle diameter of volume cumulative frequency 50% (D50) of 25 μm.

Next, by powder X-ray diffractometry using an X-ray diffractometer with a Cu—Kα tube as the X-ray source, each crystal structure of the hydrogen-absorbing alloy powders A to K was determined. Here, the X-ray diffraction measurement was carried out at a scan speed of 1°/min, a tube voltage of 40 kV, a tube current of 300 mA, a scan step of 1°, and a measuring angle of 20 to 50 θ/deg.

For calculating each crystal structure ratio, the $A_5B_{19}$ type structure was regarded as the $Pr_5Co_{19}$ type structure and $Ce_5Co_{19}$ type structure, the $A_2B_7$ type structure was regarded as the $Ce_2Ni_7$ type structure and $Gd_2Ni_7$ type structure, the $AB_5$ type structure was regarded as the $LaNi_5$ type structure, and the $AB_3$ type structure was regarded as the $PuNi_3$ type structure. Then, each structure ratio was calculated by comparing each maximum intensity between 42 and 44° of the obtained profile with each diffraction peak intensity in the database of National Institute for Material Science (NIMS).

In addition, each average C axis length of crystal lattice of the hydrogen-absorbing alloy powders A1 to A7 and B to K was calculated from the C axis length of each crystal structure described in the NIMS database.

Each structure ratio and average C axis length of the crystal structures of the hydrogen-absorbing alloy powders A1 to A7 and B to K are shown in Table 2.

TABLE 1

| Hydrogen storage alloy powder | Hydrogen storage alloy composition | | | | | | | | | | | | | Heat treatment condition | |
|---|---|---|---|---|---|---|---|---|---|---|---|---|---|---|---|
| | Re | | | | | Mg | Ni | | T | | | | | Ta | |
| | La x | y | Pr | Nd | Sm | x/y | 1 − x − y | n − z | z | Co | Mn | Al | Zn | B/A n | (° C.) | Hour |
| A1 | 0.53 | 0.36 | — | — | 0.36 | 1.5 | 0.11 | 3.61 | 0.09 | — | — | 0.09 | — | 3.70 | 50 | 10 |
| A2 | | | | | | | | | | | | | | | 50 | 20 |
| A3 | | | | | | | | | | | | | | | 90 | 10 |
| A4 | | | | | | | | | | | | | | | 40 | 10 |
| A5 | | | | | | | | | | | | | | | 50 | 7 |
| A6 | | | | | | | | | | | | | | | 100 | 10 |
| A7 | | | | | | | | | | | | | | | 30 | 10 |
| B | 0.62 | 0.18 | — | — | 0.18 | 3.5 | 0.20 | 3.51 | 0.09 | — | — | 0.09 | — | 3.60 | 50 | 10 |
| C | 0.19 | 0.70 | — | — | 0.70 | 0.3 | 0.11 | 3.25 | 0.25 | — | — | 0.15 | 0.10 | 3.50 | | |
| D | 0.17 | 0.70 | 0.17 | 0.52 | — | 0.3 | 0.13 | 3.43 | 0.17 | — | — | 0.17 | — | 3.60 | | |
| E | 0.53 | 0.36 | — | — | 0.36 | 1.5 | 0.11 | 3.71 | 0.09 | — | — | 0.09 | — | 3.80 | | |
| F | 0.53 | 0.36 | — | — | 0.36 | 1.5 | 0.11 | 3.66 | 0.09 | — | — | 0.09 | — | 3.75 | | |
| G | 0.64 | 0.16 | — | — | 0.16 | 4.0 | 0.20 | 3.56 | 0.09 | — | — | 0.09 | — | 3.65 | | |
| H | 0.64 | 0.16 | — | — | 0.16 | 4.0 | 0.20 | 3.54 | 0.18 | — | — | 0.18 | — | 3.72 | | |
| I | 0.65 | 0.15 | — | — | 0.15 | 4.3 | 0.20 | 3.35 | 0.10 | — | — | 0.10 | — | 3.45 | | |
| J | 0.18 | 0.71 | — | 0.71 | — | 0.3 | 0.11 | 3.73 | 0.09 | — | — | 0.09 | — | 3.82 | | |
| K | 0.19 | 0.70 | — | — | 0.70 | 0.3 | 0.11 | 3.18 | 0.32 | — | — | 0.17 | 0.15 | 3.50 | | |

TABLE 2

| Hydrogen storage alloy powder | Each structure ratio of crystal structure | | | | Average C axis length (Å) |
|---|---|---|---|---|---|
| | $AB_3$ | $A_2B_7$ | $A_5B_{19}$ | $AB_5$ | |
| A1 | 3% | 34% | 57% | 6% | 32 |
| A2 | 8% | 21% | 64% | 6% | 36 |
| A3 | 5% | 32% | 57% | 6% | 31 |
| A4 | 8% | 14% | 73% | 5% | 39 |
| A5 | 1% | 59% | 29% | 11% | 25 |
| A6 | 3% | 57% | 30% | 10% | 27 |
| A7 | 0% | 62% | 27% | 10% | 27 |
| B | 5% | 32% | 57% | 6% | 30 |
| C | 7% | 53% | 39% | 1% | 30 |
| D | 0% | 55% | 45% | 0% | 30 |
| E | 11% | 5% | 79% | 5% | 41 |
| F | 10% | 12% | 71% | 8% | 37 |
| G | 8% | 30% | 47% | 16% | 28 |
| H | 2% | 43% | 43% | 12% | 27 |
| I | 6% | 76% | 13% | 5% | 26 |

TABLE 2-continued

| Hydrogen storage alloy powder | Each structure ratio of crystal structure | | | | Average C axis length (Å) |
|---|---|---|---|---|---|
| | $AB_3$ | $A_2B_7$ | $A_5B_{19}$ | $AB_5$ | |
| J | 0% | 9% | 81% | 10% | 43 |
| K | 17% | 32% | 32% | 19% | 30 |

2. Hydrogen Storage Alloy Negative Electrode

A hydrogen-absorbing alloy negative electrode 11 was prepared as follows.

First, each of the hydrogen-absorbing alloy powders A1 to A7 and B to K described above, a water soluble binding agent, thermoplastic elastomer, and carbonaceous conductive material were mixed and kneaded to prepare a hydrogen-absorbing alloy slurry.

The used water soluble binding agent included 0.1% by mass of carboxymethyl cellulose (CMC) and water (or pure water). Styrene butadiene rubber (SBR) was used as the thermoplastic elastomer. Ketjenblack was used as the carbonaceous conductive material.

Next, the alloy slurry prepared above was coated on an electrically-conductive substrate for negative electrode so as to have a predetermined packing density (for example, 5.0 g/cm$^3$) and dried, and then the substrate was rolled so as to have a predetermined thickness. Then, the substrate was cut into a predetermined size to prepare the hydrogen-absorbing alloy negative electrode 11.

As the electrically-conductive substrate for negative electrode, a mild steel porous substrate (punching metal) coated with nickel was used.

3. Nickel Positive Electrode

A nickel positive electrode 12 was prepared as follows.

First, a porous nickel sintered substrate with a porosity of about 85% was immersed in a mixed aqueous solution with a specific gravity of 1.75 containing nickel nitrate and cobalt nitrate to hold the nickel salt and the cobalt salt in the pores of the porous nickel sintered substrate. Then, the porous nickel sintered substrate was immersed in an aqueous solution of 25% by mass of sodium hydroxide (NaOH) to convert the nickel salt and the cobalt salt into nickel hydroxide and cobalt hydroxide, respectively.

Next, the substrate was sufficiently washed with water to remove the alkaline solution, and then dried to fill the pores of the porous nickel sintered substrate with the active material including nickel hydroxide as the main component. Such active material filling operation was repeated predetermined times (for example six times) to fill the pores of the porous sintered substrate with the active material including nickel hydroxide as the main component so as to have a packing density of 2.5 g/cm$^3$. Then, the substrate was dried at room temperature and then cut into a predetermined size to prepare the nickel positive electrode 12.

4. Nickel-Hydrogen Storage Battery

A nickel-metal hydride battery 10 was prepared as follows.

First, the hydrogen-absorbing alloy negative electrode 11 and the nickel positive electrode 12 each prepared as above were used, a separator 13 made of nonwoven fabric containing sulfonated polypropylene fiber was interposed therebetween, and the whole was rolled spirally to prepare a spiral electrode group.

Here, on a lower part of the spiral electrode group prepared in this manner, a substrate exposed portion 11c of the hydrogen-absorbing alloy negative electrode 11 is exposed, and on an upper part thereof, a substrate exposed portion 12c of the nickel positive electrode 12 is exposed. Next, to the substrate exposed portion 11c exposed on the lower end face of the obtained spiral electrode group, a negative electrode collector 14 was welded as well as, on the substrate exposed portion 12c of the nickel positive electrode 12 exposed on the upper end face of the spiral electrode group, a positive electrode collector 15 was welded to make an electrode assembly.

Next, the obtained electrode assembly was stored in a cylinder-shaped iron outer can 16 with a bottom coated with nickel (an outer surface of the bottom face was a negative electrode external terminal), and then, the negative electrode collector 14 was welded to an inner bottom face of the outer can 16. On the other hand, a collector lead part 15a led from the positive electrode collector 15 was welded to a sealing plate 17a that was a bottom part of a cover 17 also serving as a positive electrode terminal and having an insulating gasket 18 on a peripheral part thereof. Here, the cover 17 includes a positive electrode cap 17b, and in the positive electrode cap 17b, a pressure valve including a valve 17c and a spring 17d that are deformed when reaching a predetermined pressure is placed.

Next, an annular groove part 16a was formed on an upper peripheral part of the outer can 16, then, an electrolyte was poured, and the insulating gasket 18 installed on the peripheral part of the cover 17 was put on the annular groove part 16a formed on the upper part of the outer can 16. Then, a mouth end 16b of the outer can 16 was crimped, and an alkaline electrolyte composed of an aqueous solution of 30% by mass of potassium hydroxide (KOH) was poured into the outer can 16 so as to be 2.5 g/Ah per battery capacity to prepare the nickel-metal hydride battery 10 for each of Examples 1 to 10 and Comparative Examples 1 to 7.

5. Battery Test (1) Activation

Activation was carried out as follows.

First, the nickel-metal hydride battery 10 of each of Examples 1 to 10 and Comparative Examples 1 to 7 prepared as above was left until the battery voltage reached 60% of the leaving peak voltage, then charged in a temperature environment of 25° C. at a charging current of 1 It until 120% of state of charge (SOC), and left in a temperature environment of 25° C. for 1 hour. Next, the battery was left in a temperature environment of 70° C. for 24 hours, and then discharged in a temperature environment of 45° C. at a discharging current of 1 It until the battery voltage reached 0.3 V. Such cycle was repeated 2 cycles.

(2) Evaluation of Output Characteristics

In order to examine the output power stability, the power characteristics was evaluated as follows.

First, each nickel-metal hydride battery 10 of Examples 1 to 10 and Comparative Examples 1 to 7 activated as above was charged in a temperature environment of 25° C. at a charging current of 1 It until 50% of state of charge (SOC), and then left in a temperature environment of 25° C. for 1 hour.

Next, the battery was charged in a temperature environment of −10° C. at an arbitrary charge rate for 20 seconds, and then left in a temperature environment of −10° C. for 30 minutes. Then, the battery was discharged in a temperature environment of −10° C. at an arbitrary discharge rate for 10 seconds, and then left in a temperature environment of −10° C. for 30 minutes. Such charging in a temperature environment of −10° C. at an arbitrary charge rate for 20 seconds, leaving for 30 minutes, discharging at an arbitrary discharge rate for 10 seconds, and leaving in a temperature environment of −10° C. for 30 minutes were repeated.

In this case, as for the arbitrary charge rate, the charging current was increased in the order from 0.8 It, 1.7 It, 2.5 It, 3.3

It, and to 4.2 It, and as for the arbitrary discharge rate, the discharging current was increased in the order from 1.7 It, 3.3 It, 5.0 It, 6.7 It, and to 8.3 It. The battery voltage (V) of each battery after 10 seconds discharging was measured at each discharge rate.

Next, the measured battery voltage (V) of each battery after 10 seconds discharging was plotted two-dimensionally with respect to the discharging current of each discharge rate, an approximated curve showing the relation between the battery voltage and the discharging current was determined, and then the discharging current at 0.9 V on the approximated curve was obtained as SOC 50% power characteristics.

Moreover, SOC 20% power characteristics were obtained in the same manner as the above except that each activated nickel-metal hydride battery 10 of Examples 1 to 10 and Comparative Examples 1 to 7 was charged in a temperature environment of 25° C. at a charging current of 1 It until 20% of SOC.

Furthermore, the ratio of the SOC 50% power characteristics to the SOC 20% power characteristics was calculated as the output power stability (SOC 20% power characteristics/SOC 50% power characteristics).

The SOC 50% power characteristics, the SOC 20% power characteristics, and the output power stability each obtained as above are shown in Table 3 and Table 4. In each Table, the battery of Example 1 was regarded as the standard (100%) and the others are shown as relative ratios (%).

(3) Evaluation of Discharge Reserve Characteristics

In order to examine the corrosion resistance of the hydrogen-absorbing alloy, discharge reserve accumulation rate was determined as follows.

First, from each nickel-metal hydride battery 10 of Examples 1 to 10 and Comparative Examples 1 to 7 activated as above, the cover 17 was removed to open the battery, then a lead wire was attached to each of the positive and negative electrode terminals of the battery, and the battery was placed in a beaker.

Next, to the beaker a KOH aqueous solution was poured so as to immerse the battery in the KOH aqueous solution as well as a reference electrode (Hg/HgO) was placed in the beaker. Next, the lead wire of the battery was connected to an external discharge circuit and the battery was forcibly discharged.

The positive electrode active material was completely discharged by the forcible discharge, then the battery was discharged in a temperature environment of 25° C. at a discharging current of 1 It until the negative electrode potential reached 0.3 V with respect to the reference electrode (Hg/HgO). From this discharging period, the capacity of the negative electrode at 1 It discharging was calculated.

Then, the discharging was stopped for 10 minutes, then the battery was discharged at a discharging current of 0.1 It until the negative electrode potential reached 0.3 V with respect to the reference electrode (Hg/HgO). From this discharging period, the capacity of the negative electrode at 0.1 It discharging was calculated. The obtained capacity at 1 It discharging and the capacity at 0.1 It discharging were summed to give the discharge reserve capacity. The ratio of the obtained discharge reserve capacity to the nominal battery capacity was calculated to give the discharge reserve accumulation rate ((discharge reserve capacity/nominal battery capacity)×100%) and the results are shown in Table 3. In each Table, the discharge reserve accumulation rate of the battery of Example 1 was regarded as the standard (100%) and the others are shown as relative ratios (%).

6. Discussion on Hydrogen Storage Alloy Composition

TABLE 3

| Battery | Hydrogen storage alloy powder | Output characteristics SOC 50% | Output characteristics SOC 20% | Output power stability SOC 20%/SOC 50% | Corrosion resistance Reserve accumulation rate |
|---|---|---|---|---|---|
| Example 1 | A1 | 100% | 100% | 100% | 100% |
| Example 2 | B | 103% | 103% | 100% | 96% |
| Example 3 | C | 105% | 109% | 104% | 100% |
| Example 4 | D | 101% | 101% | 100% | 96% |
| Example 5 | E | 112% | 116% | 103% | 97% |
| Example 6 | F | 102% | 105% | 103% | 96% |
| Example 7 | K | 103% | 101% | 98% | 122% |
| Comparative Example 1 | G | 96% | 88% | 92% | 109% |
| Comparative Example 2 | H | 93% | 85% | 91% | 102% |
| Comparative Example 3 | I | 88% | 74% | 84% | 95% |
| Comparative Example 4 | J | 120% | 127% | 106% | 130% |

As apparent from Table 3, among the hydrogen-absorbing alloy powders having a ratio of La to Re (x/y) of 4.0 or more, the hydrogen-absorbing alloy powders G and H have a large structure ratio of the $AB_5$ type structure and the hydrogen-absorbing alloy powder I has a large structure ratio of the $A_2B_7$ type structure. Thus, each of the hydrogen-absorbing alloy powders has a small average C axis length of crystal lattice of 26 to 28 Å. Therefore, it is clear that each of the batteries of Comparative Examples 1 to 3 using these hydrogen-absorbing alloy powders has low power characteristics and a low output power stability of 84 to 92%.

Furthermore, the hydrogen-absorbing alloy powder J having a stoichiometric ratio n of more than 3.8 has a large structure ratio of the $A_5B_{19}$ type structure and an average C axis length of crystal lattice of more than 41 Å.

Therefore, it is revealed that the battery of Comparative Example 4 using this hydrogen-absorbing alloy powder has very high power characteristics and a good output power stability of 106%.

However, the battery of Comparative Example 4 has a high reserve accumulation rate which shows the corrosion resistance of a hydrogen-absorbing alloy of 130% and it is clear that the hydrogen-absorbing alloy has a decreased corrosion resistance. This is considered to be because the $A_5B_{19}$ structure ratio is increased to accelerate the pulverization of the hydrogen-absorbing alloy.

In contrast, it is clear that each of the batteries of Examples 1 to 6 using the hydrogen-absorbing alloy powders A1 and B to F has good power characteristics, good output power stability, and good corrosion resistance.

Further investigation on this point reveals that, when the stoichiometric ratio n is 3.5 to 3.8, the ratio of La to Re (x/y) is 3.5 or less, and the average C axis length α of crystal lattice is 30 to 41 Å, the battery has good power characteristics, good output power stability, and good corrosion resistance.

Moreover, it is clear that the battery of Example 7 using the hydrogen-absorbing alloy powder K having a z value of the replacing element (T) of more than 0.25 does not have decreased power characteristics and decreased output power stability but exhibits slightly decreased corrosion resistance as compared with the batteries of Examples 1 to 6.

This is considered to be because, when z is more than 0.25, the amount of the Ni replacing element having low melting point is increased to increase the segregation phase.

Further investigation on this point reveals that, when the z value of the replacing element (T) is 0.25 or less, such problem is solved. In order to maintain the characteristics of the hydrogen-absorbing alloy, the z value is preferably 0.09 or more.

Not shown in Tables, it is ascertained that, when Co is used as the Ni replacing element T, Co is leached out in an alkaline storage battery to re-precipitate on a separator and then causes micro-short circuit that is particularly problematic for the applications with high reliability such as HEVs.

Therefore, it is preferable that the hydrogen-absorbing alloy does not include Co as the Ni replacing element T.

7. Discussion on Heat Treatment Condition of Hydrogen Storage Alloy

TABLE 4

| Battery | Hydrogen storage alloy powder | Output characteristics SOC 50% | Output characteristics SOC 20% | Output power stability SOC 20%/SOC 50% |
|---|---|---|---|---|
| Example 1 | A1 | 100% | 100% | 100% |
| Example 8 | A2 | 100% | 100% | 100% |
| Example 9 | A3 | 100% | 100% | 100% |
| Example 10 | A4 | 102% | 104% | 102% |
| Comparative Example 5 | A5 | 94% | 89% | 95% |
| Comparative Example 6 | A6 | 92% | 85% | 93% |
| Comparative Example 7 | A7 | 95% | 92% | 97% |

As apparent from Table 4, the battery of Comparative Example 5 using the hydrogen-absorbing alloy powder A5 of which heat treatment period is less than 10 hours, the battery of Comparative Example 6 using the hydrogen-absorbing alloy powder A6 that is treated at a temperature of 100° C. lower than the melting point of the hydrogen-absorbing alloy, and the battery of Comparative Example 7 using the hydrogen-absorbing alloy powder A7 that is heat-treated at a temperature of 30° C. lower than the melting point of the alloy ingot all have the low structure ratio of the $A_5B_{19}$ type structure in the hydrogen-absorbing alloy. Accordingly, each average C axis length of crystal lattice becomes small, and it is clear that each battery has decreased output power stability.

In contrast, it is clear that each of the batteries of Example 1 and Examples 8 to 10 using the hydrogen-absorbing alloy powders A1 to A4 has good power characteristics, good output power stability, and good corrosion resistance.

Investigation on this point reveals that, when the heat treatment was performed at a temperature of from 90° C. to 40° C. lower than the melting point of the hydrogen-absorbing alloy for 10 hours or more, the structure ratio of $A_5B_{19}$ type structure becomes high in a certain amount, and an average C axis length α of crystal lattice is in the range of 30 to 41 Å, thus the battery obtains good power characteristics, good output power stability, and good corrosion resistance.

The above described embodiments show that, by controlling the heat treatment temperature and period, in the rare earth-Mg—Ni-based hydrogen-absorbing alloy containing the $A_5B_{19}$ type structure as the main phase, the structure ratio of subphases such as the $AB_3$ type structure, $AB_5$ type structure, and $A_2B_7$ type structure is controlled. However, by controlling the cooling speed when the heated and melted metal that is metallic elements to be raw materials for the hydrogen-absorbing alloy is solidified, the structure ratio of the subphases such as the $AB_3$ type structure, $AB_5$ type structure, and $A_2B_7$ type structure can also be controlled.

What is claimed is:

1. A hydrogen-absorbing alloy for an alkaline storage battery comprising:
$AB_n$ (A: $La_xRe_yMg_{1-x-y}$, B: $Ni_{n-z}T_z$, Re: at least one element selected from rare earth elements including Y (other than La), T: at least one element selected from Co, Mn, Zn, and Al, and z>0);
a stoichiometric ratio n being 3.5 to 3.8,
a ratio of La to Re (x/y) being 3.5 or less,
being comprised of an $A_5B_{19}$ type structure and non-$A_5B_{19}$ type structures, and
an average C axis length a of crystal lattice being 30 to 41 Å.

2. The hydrogen-absorbing alloy for an alkaline storage battery according to claim 1, wherein z is 0.25 or less and T does not include Co.

3. The hydrogen-absorbing alloy for an alkaline storage battery according to claim 1, wherein Re is Sm.

4. A hydrogen-absorbing alloy for an alkaline storage battery comprising:
$AB_n$ (A: $La_xRe_yMg_{1-x-y}$, B: $Ni_{n-z}T_z$, Re: at least one element selected from rare earth elements including Y (other than La), T: at least one element selected from Co, Mn, Zn, and Al, and z>0);
a stoichiometric ratio n being 3.5 to 3.8,
a ratio of La to Re (x/y) being 3.5 or less,
at least having an $A_5B_{19}$ type structure,
an average C axis length a of crystal lattice being 30 to 41 Å; and
the hydrogen-absorbing alloy being comprised of an $A_5B_{19}$ type structure and non-$A_5B_{19}$ type structures, and the ratio of the $A_5B_{19}$ type structure being 39 to 79%".

* * * * *